United States Patent
Miyasaka et al.

(10) Patent No.: US 6,898,615 B2
(45) Date of Patent: May 24, 2005

(54) SIGNAL PROCESSING UNIT AND SIGNAL PROCESSING METHOD INCLUDING USING AN EXPONENT PART AND A MANTISSA PART FOR POWER GENERATION

(75) Inventors: Shuji Miyasaka, Neyagawa (JP); Takeshi Norimatsu, Kobe (JP); Mineo Tsushima, Katano (JP); Tomokazu Ishikawa, Toyonaka (JP); Yoshiaki Sawada, Moriguchi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 652 days.

(21) Appl. No.: 09/909,971

(22) Filed: Jul. 23, 2001

(65) Prior Publication Data
US 2002/0026468 A1 Feb. 28, 2002

(30) Foreign Application Priority Data
Jul. 24, 2000 (JP) ............................. 2000-222264

(51) Int. Cl.⁷ .................................................. G06F 1/02
(52) U.S. Cl. ................... 708/606; 708/204; 708/495
(58) Field of Search .............................. 708/606, 495, 708/605, 204, 500

(56) References Cited

U.S. PATENT DOCUMENTS

| | | | | |
|---|---|---|---|---|
| 5,528,741 A | * | 6/1996 | Lucas | 345/593 |
| 5,926,406 A | * | 7/1999 | Tucker et al. | 708/606 |
| 6,128,638 A | * | 10/2000 | Thomas | 708/606 |
| 6,480,873 B1 | * | 11/2002 | Inoue et al. | 708/606 |
| 6,559,856 B1 | * | 5/2003 | Fossum et al. | 345/600 |
| 6,598,063 B1 | * | 7/2003 | Tang et al. | 708/606 |
| 6,681,237 B1 | * | 1/2004 | Fossum et al. | 708/606 |
| 2003/0163502 A1 | * | 8/2003 | Abe et al. | 708/606 |

FOREIGN PATENT DOCUMENTS

JP  11-288365 A  10/1999

* cited by examiner

*Primary Examiner*—D. H. Malzahn
(74) *Attorney, Agent, or Firm*—Smith Patent Office (57) ABSTRACT

An exponent part extraction section extracts a bit series from the exponent part of an inputted floating point data. A mantissa part extraction section extracts the uppermost K bits from the mantissa part of the floating point data. A first conversion section inputs the output e from the exponent part extraction section and outputs the value of a function X(e) thereof. A second conversion section inputs the output f from the mantissa part extraction section and outputs the value of a function Y(f) thereof. A multiplier section multiplies together these values. By setting suitable tables in advance in the first and the second conversion sections, the calculation of the v^p for an item v of floating point data can be performed.

11 Claims, 11 Drawing Sheets

| 0 | 0.000000 |
|---|---|
| 1 | 1.000000 |
| 2 | 2.519842 |
| 3 | 4.326749 |
| 4 | 6.349604 |
| 5 | 8.549880 |
| 6 | 10.902724 |
| 7 | 13.390518 |
| 8 | 16.000000 |
| 9 | 18.720754 |
| 500 | 3968.502530 |
| 1014 | 10187.100875 |
| 1015 | 10200.498344 |
| 1016 | 10213.900213 |
| 1017 | 10227.306480 |
| 1018 | 10240.717141 |
| 1019 | 10254.132195 |
| 1020 | 10267.551638 |
| 1021 | 10280.975446 |
| 1022 | 10294.403678 |
| 1023 | 10307.836271 |

| Address | Data | |
|---|---|---|
| 0 | 0.000000 | 22 |
| 1 | 0.000000 | |
| 2 | 0.000000 | |
| ... | ... | |
| 125 | 0.000691 | |
| 126 | 0.001161 | |
| 127 | 0.001953 | |
| 128 | 0.003285 | |
| 129 | 0.005524 | |
| 130 | 0.009291 | |
| 131 | 0.015625 | |
| 132 | 0.026278 | |
| 133 | 0.044194 | |
| 134 | 0.074325 | |
| 135 | 0.125000 | |
| 136 | 0.210224 | |
| 137 | 0.353553 | |
| 138 | 0.594604 | |
| 139 | 1.000000 | |
| 140 | 1.681793 | |
| 141 | 2.828427 | |
| 142 | 4.756828 | |
| 143 | 8.000000 | |
| 144 | 13.454343 | |
| 145 | 22.627417 | |
| 146 | 38.054628 | |
| 147 | 64.000000 | |
| 148 | 107.634741 | |
| 149 | 181.019336 | |
| 150 | 304.437021 | |
| 151 | 512.000000 | |
| ... | ... | |
| 255 | $1.54742505 * e26$ | |

FIG. 6

| Address | Data | |
|---|---|---|
| 0 | 512.000000 | ~23 |
| 1 | 512.093750 | |
| 2 | 512.187500 | |
| 3 | 512.281250 | |
| 4 | 512.374939 | |
| 2045 | 693.712158 | |
| 2046 | 693.796936 | |
| 2047 | 693.881653 | |
| 2048 | 693.966309 | |
| 2049 | 694.051025 | |
| 2050 | 694.135742 | |
| 2051 | 694.220459 | |
| 3582 | 820.230835 | |
| 3583 | 820.310913 | |
| 3584 | 820.391052 | |
| 3585 | 820.471191 | |
| 3586 | 820.551270 | |
| 4092 | 860.762573 | |
| 4093 | 860.841431 | |
| 4094 | 860.920227 | |
| 4095 | 860.999084 | |

F I G. 7

| Address | Data |
|---|---|
| 0 | 0.000000 |
| 1 | 0.000000 |
| 2 | 0.000000 |
| 125 | 0.353553 |
| 126 | 0.594604 |
| 127 | 1.000000 |
| 128 | 1.681793 |
| 129 | 2.828427 |
| 130 | 4.756828 |
| 131 | 8.000000 |
| 132 | 13.454343 |
| 133 | 22.627417 |
| 134 | 38.054628 |
| 135 | 64.000000 |
| 136 | 107.634741 |
| 137 | 181.019336 |
| 138 | 304.437021 |
| 139 | 512.000000 |
| 140 | 861.077929 |
| 141 | 1448.154688 |
| 142 | 2435.496172 |
| 143 | 4096.000000 |
| 144 | 6888.623434 |
| 145 | 11585.237503 |
| 146 | 19483.969372 |
| 147 | 32768.000000 |
| 148 | 55108.987470 |
| 149 | 92681.900024 |
| 150 | 155871.754978 |
| 151 | 262144.000000 |
| 255 | 7.92281625142e28 |

FIG. 8

| Address | Data |
|---|---|
| 0 | 1.000000 |
| 1 | 1.000183 |
| 2 | 1.000366 |
| 3 | 1.000549 |
| 4 | 1.000732 |
| 2045 | 1.354907 |
| 2046 | 1.355072 |
| 2047 | 1.355238 |
| 2048 | 1.355403 |
| 2049 | 1.355568 |
| 2050 | 1.355734 |
| 2051 | 1.355899 |
| 3582 | 1.602013 |
| 3583 | 1.602170 |
| 3584 | 1.602326 |
| 3585 | 1.602483 |
| 3586 | 1.602639 |
| 4092 | 1.681177 |
| 4093 | 1.681331 |
| 4094 | 1.681485 |
| 4095 | 1.681639 |

| Address | Data |
|---------|------|
| 0 | 2 |
| 1 | 2 |
| 2 | 2 |
| 3 | 2 |
| 4 | 2 |
| 5 | 2 |
| 6 | 2 |
| 7 | 2 |
| 8 | 3 |
| 9 | 3 |
| 10 | 3 |
| 11 | 3 |
| 12 | 3 |
| 13 | 3 |
| 14 | 3 |
| 15 | 3 |
| 16 | 4 |
| 17 | 4 |
| 18 | 4 |
| 19 | 4 |
| 20 | 5 |
| 21 | 5 |
| 22 | 5 |
| 23 | 5 |
| 24 | 6 |
| 25 | 6 |
| 26 | 6 |
| 27 | 6 |
| 28 | 7 |
| 29 | 7 |
| 30 | 7 |

| Address | Data |
|---------|------|
| 31 | 7 |
| 32 | 8 |
| 33 | 8 |
| 34 | 9 |
| 35 | 9 |
| 36 | 10 |
| 37 | 10 |
| 38 | 11 |
| 39 | 11 |
| 40 | 12 |
| 41 | 12 |
| 42 | 13 |
| 43 | 13 |
| 44 | 14 |
| 45 | 14 |
| 46 | 15 |
| 47 | 15 |
| 48 | 16 |
| 49 | 17 |
| 50 | 18 |
| 51 | 19 |
| 52 | 20 |
| 53 | 21 |
| 54 | 22 |
| 55 | 23 |
| 56 | 24 |
| 57 | 25 |
| 58 | 26 |
| 59 | 27 |
| 60 | 28 |
| 61 | 29 |
| 62 | 30 |
| 63 | 31 |

SIGNAL PROCESSING UNIT AND SIGNAL PROCESSING METHOD INCLUDING USING AN EXPONENT PART AND A MANTISSA PART FOR POWER GENERATION

BACKGROUND OF THE INVENTION

1. Field of the Invention

The present invention relates to a signal processing unit and signal processing method for data in floating point format which calculate the p-th power of v (v^p), and to a program product for implementing the method.

2. Discussion of the Related Art

In Japanese Unexamined Patent Publication No. 11-288365, the present inventors have described the structure of an exponential calculation device. The device, when the input value x is an integer, calculates the value of x^(4/3), for example, with an economical circuit structure and at high speed. In that proposal, the range of variation of the input value x is, for example, greater than or equal to 0 and less than 8192. For this type of input value x, the value of X^(⅓) is calculated as follows.

Figure 1:
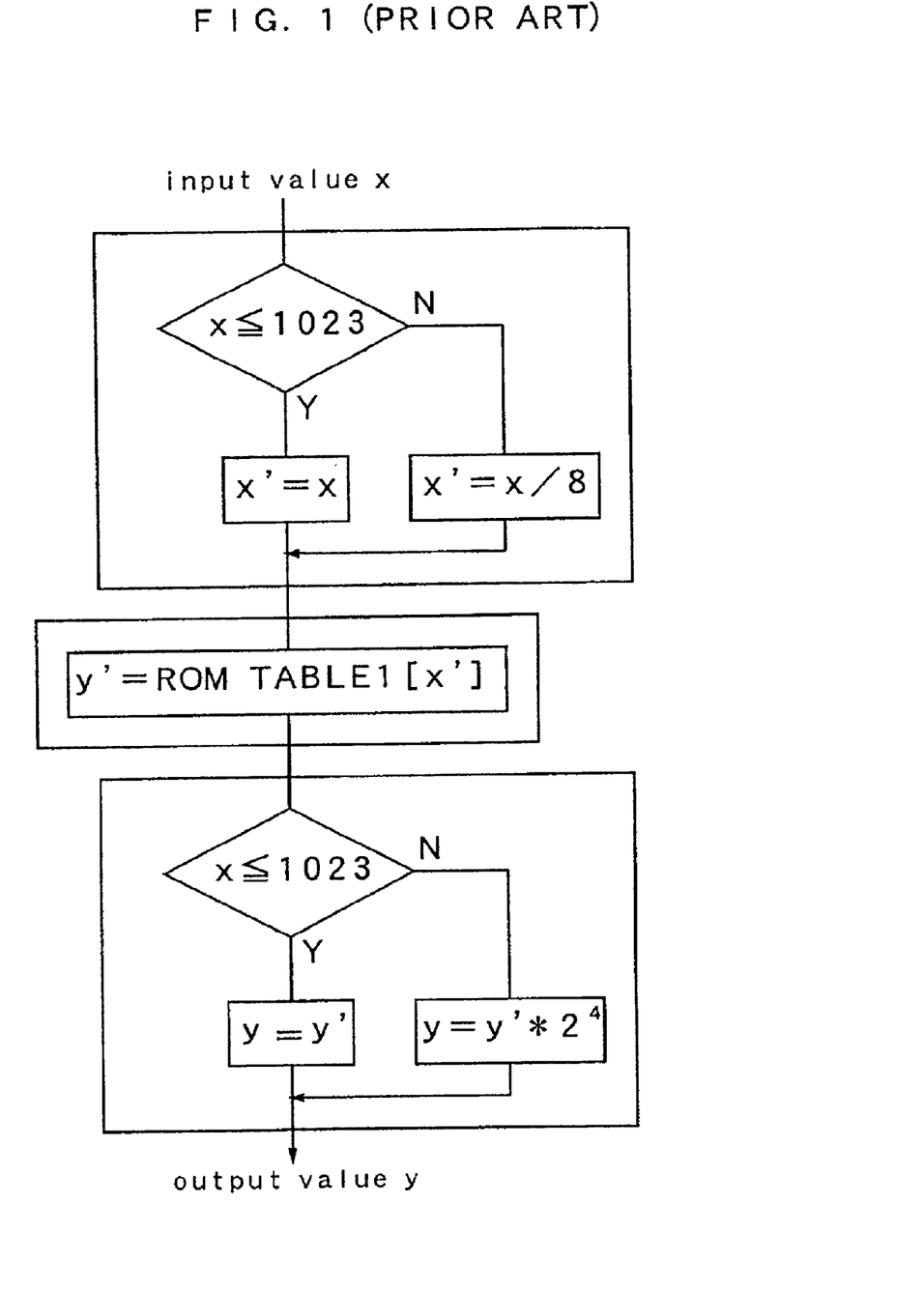
FIG. 1 is a flow chart showing an exponential calculation method performed by an exponential calculation device according to an example of the prior art.
Figure 2:
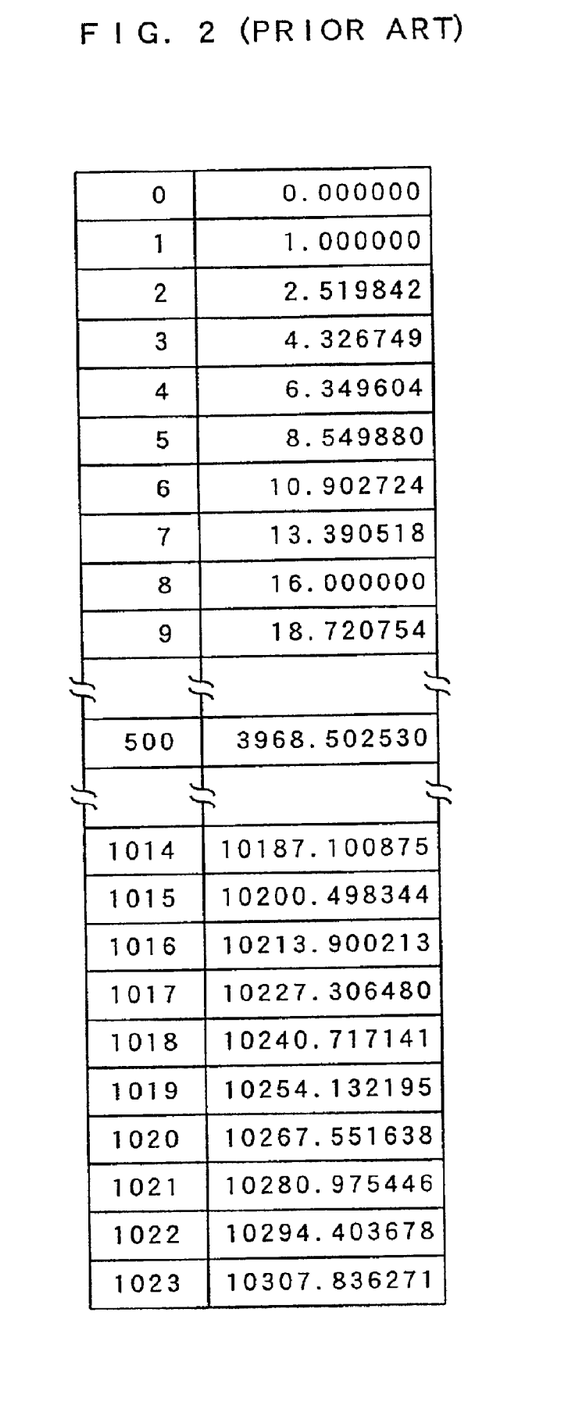
FIG. 2 is a figure showing a ROM table stored in this exponential calculation device according to this example of the prior art.

First, as shown in FIG. 1, a decision is made as to whether or not the input value x is less than or equal to 1023. If the value of x is less than or equal to 1023, then the value of a variable x' is set to be equal to x, while if it is not then x' is set to be equal to ⅝. In other words, the value of x', at this stage, becomes x' less than or equal to 1023. The value of x' set in this manner is used as an address for looking up a ROM table. As shown in FIG. 2, the ⅓ powers of values of x' from 0 to 1023 are stored in this ROM table.

Thus, looking up from this type of ROM table using x'as an address, and the data value at the address obtained will be termed y'. If the original input value x was a value less than or equal to 1023, then y is set to be equal to y', while otherwise y is set to be equal to y*16. The value y obtained by this calculation is the required value of x^(⅓).

By doing this it is possible to calculate the exponential of an input value—provided that it is an integer with an economical circuit structure and at high speed. However, with this type of method, it is a premise that the input value is an integer, and therefore the problem remains that this method is inapplicable if the input value is an item of floating point data.

Moreover although it is possible, after performing type conversion of an item of floating point data which has been inputted to an integer, to calculate its exponential with the structure according to the prior art described above. In this case, the extra procedure of converting floating point data to an integer is entailed, and furthermore there is the problem that a loss of calculation accuracy is caused by such a type conversion procedure.

Although in AAC (Advanced Audio Coding) procedures for example, it is necessary to perform procedures for converting real numbers into integers so as to compress symbolic data. In order to do this, memory for storing various floating point data items and memory for storing various integer data items is required, and a complicated structure, such as a main processor and a co-processor and the like, becomes necessary in order to perform conversion of floating point data values into decimal fractions.

SUMMARY OF THE INVENTION

The objective of the present invention is to provide a signal processing unit which calculates exponentials with an economical circuit structure, at high speed, and with good calculation accuracy, even when the input value is floating point data; and to provide a signal processing method for doing this, and a program product for ensuring that this signal processing method should be executed by a computer. For example, calculation of a floating point value v raised to the power 0.75 or to the power 1 (which amounts to converting it into an integer) is frequently required in AAC encoding according to the MPEG2 or the MPEG4 audio encoding method. It is the objective of the present invention to provide a signal processing unit, signal processing method, and a program product embodying the method, which can implement such calculations with an economical circuit structure and moreover at high speed.

DESCRIPTION OF THE PREFERRED EMBODIMENTS

In these preferred embodiments, the floating point format of the input data is taken to be the 32-bit floating point format according to the IEEE754 standard. First, this 32-bit floating point format according to the IEEE754 standard will be explained in outline.

Figure 3:
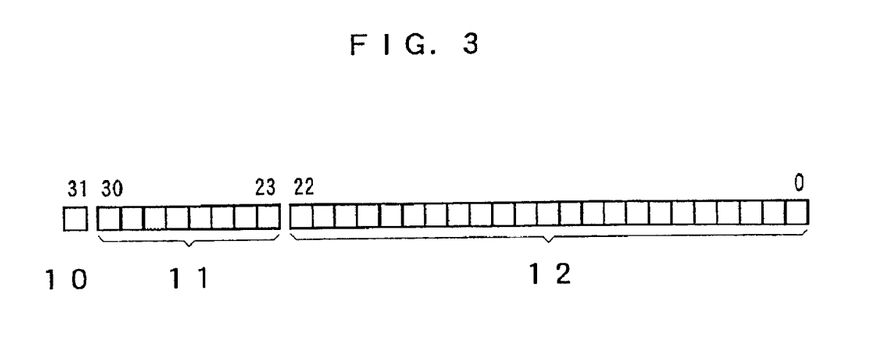
FIG. 3 is a figure showing a bit field in a 32-bit floating point format according to the IEEE 754 standard.

FIG. 3 is a figure showing the bit fields in the 32-bit floating point format according to the IEEE754 standard. In this figure, the highest one bit is the sign bit 10, and if it is "0" then the floating point number in question is positive, while if it is "1" then said number is negative.

The eight bits after the sign bit 10 are the region termed the exponent part 11. The 23 bits after the exponent part 11 are the region termed the mantissa part 12. Here, when the value of the exponent part taken as an integer of 8 bits is termed e, and the value of the 23-bit mantissa part, taken as a fixed point number with the point before the most significant bit of said 23 bits, is termed k, then the real number value which is denoted by this floating point format data item will be termed v, and:

$$v=(2^{(e-127)})*(1.k).$$

Here, the notation (1.k) indicates that the point is before the most significant bit of the 23-bit data item k, and that the bit before the point is always 1.
For example, if the 23-bit data item k is k=10000000000000000000000, then (1.k) is as follows.

$$(1.k)=B'1.10000000000000000000000=1+0.5=1.5$$

It should be noted that the notation B' means that the following number is a binary number.

To give another example for the sake of checking, if k=11100000000000000000000, then (1.k) is as follows.

$$(1.k)=B'1.11100000000000000000000=1+0.5+0.25+0.125=1.875$$

That is, the mantissa part 12 is a field which represents a value greater than or equal to 1.0 and less than 2.0. In other words, if the bit pattern of a 32-bit floating point number according to the IEEE754 standard is, for example, 01000000011100000000000000000000, then the real number value denoted by this bit pattern is as follows.

$$v=(2^{(128-127)})*1.875=3.75$$

Further, if a 32-bit floating point number is 00111111010000000000000000000000, the real number value v given by this bit pattern is as follows.

$$v=(2^{(126-127)})*1.5=0.75$$

Embodiment 1

In the following, first preferred embodiments of the signal processing unit and method of the present invention will be explained with reference to the drawings. This signal processing unit is a device which calculates the value of v^p, when v is taken as floating point data which is made up from an E-bit exponent part and an F-bit mantissa part. For the first preferred embodiment, the explanation will be made in terms of an exponential calculation device which obtains the exponential value v^0.75. This is based upon a procedure (ISO/IEC13818-7:1997) which is frequently performed in an audio encoder according to the MPEG2 or the MPEG4AAC standard.

Figure 4:
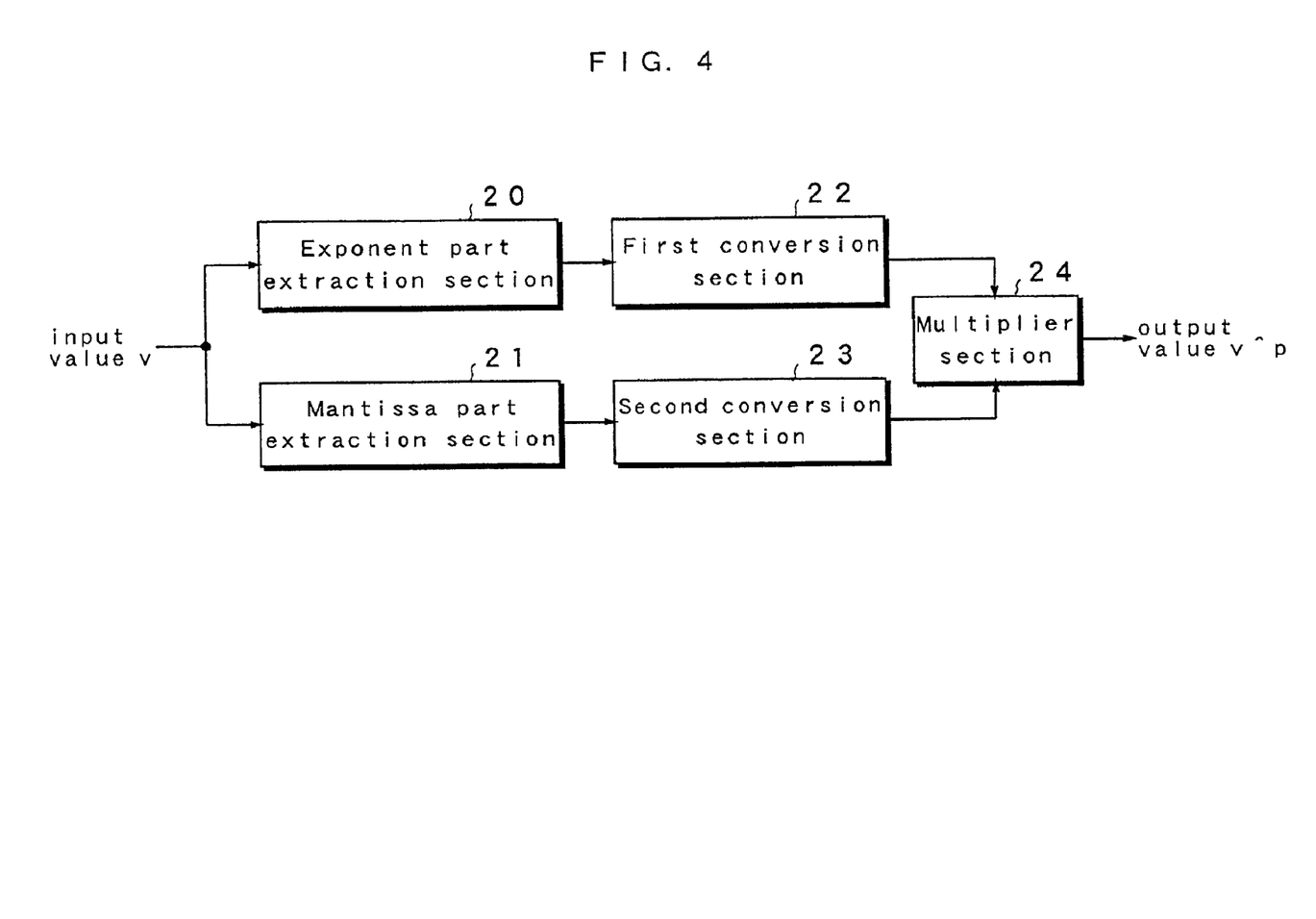
FIG. 4 is a block diagram showing the structure of a signal processing unit according to a first preferred embodiment of the present invention.

FIG. 4 is a block diagram showing the structure of a signal processing unit according to the first preferred embodiment. This signal processing unit comprises an exponent part extraction section 20, mantissa part extraction section 21, first conversion section 22, second conversion section 23, and multiplier section 24.

The exponent part extraction section 20 extracts a bit series from the exponent part of the floating point format data. In other words, in this first preferred embodiment, since it is in a floating point format which conforms to the IEEE754 32-bit floating point standard, the 8 bits of the exponent part shown in FIG. 3 are extracted.

The mantissa part extraction section 21 extracts a bit series of the most significant K bits from the mantissa part 12 of the floating point format data. In other words, in this first preferred embodiment, the most significant K bits from the 23 bits of the mantissa part 12 shown in FIG. 3 are extracted. In this embodiment, K is taken as 12.

Figure 5:
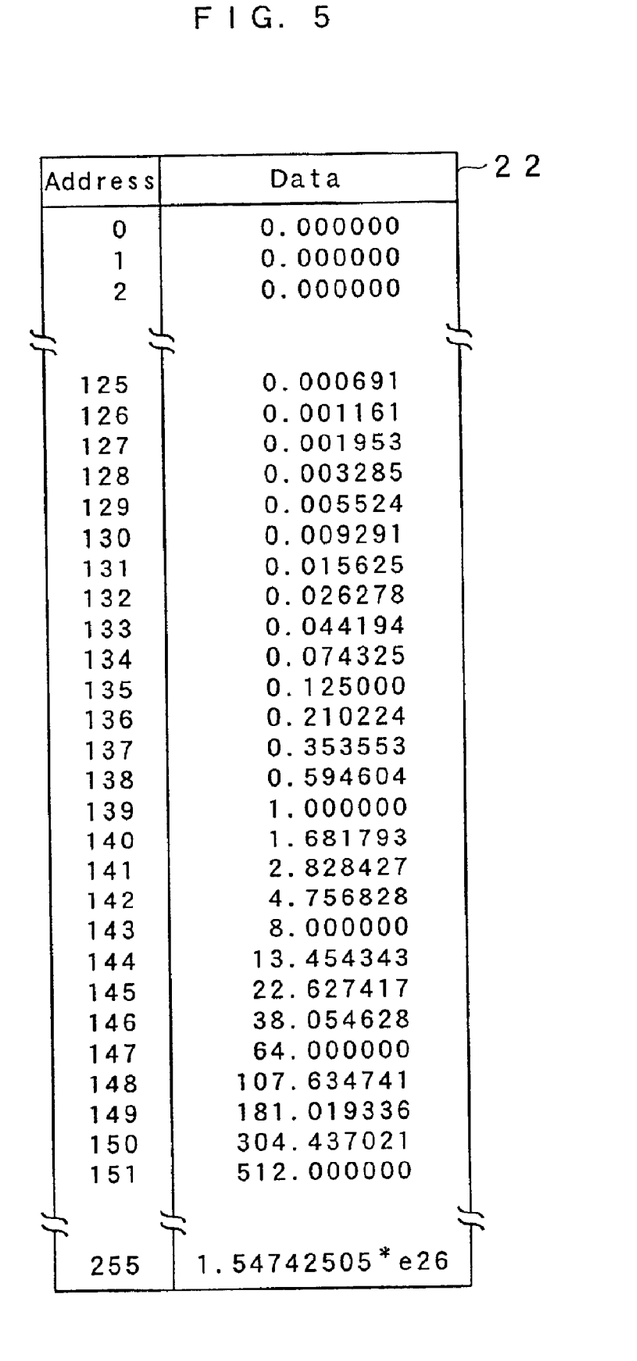
FIG. 5 is a figure showing an example of a table which constitutes a first conversion section.

The first conversion section 22 outputs the value of a function X(e) which corresponds to the output value e from the exponent part extraction section 20. FIG. 5 is a table showing the first conversion section 22. In this table, supposing the extracted value of the output value e to be i, at the address i, the values $2^{((i-127-K)*0.75)}$ are stored. This is given generally by $2^{((i((1<<(E-1))-1)-K*P)}$.

Figure 6:
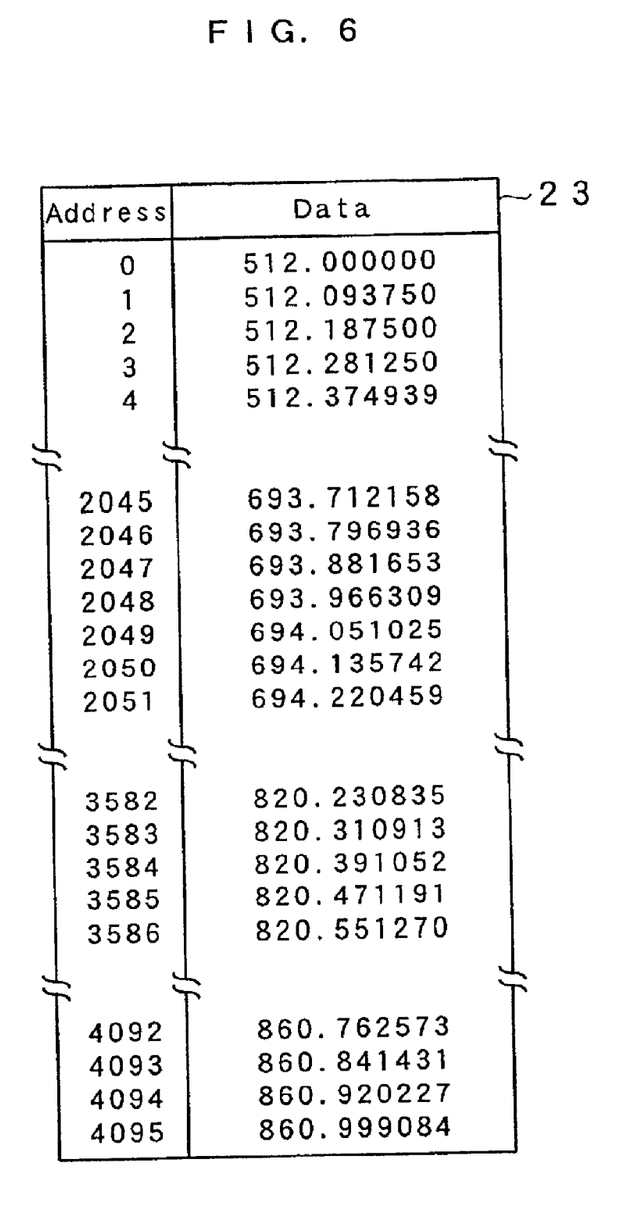
FIG. 6 is a figure showing an example of a table which constitutes a second conversion section.

The second conversion section 23 outputs the value of a function Y(f) which corresponds to the output value from the mantissa part extraction section 21. FIG. 6 is a table showing the second conversion section 23. In this table, supposing the extracted value of the output value f to be j, the values $((1<<K)+j)^{0.75}$ are stored. It should be noted that the expression "1<<K" represents $2^K$. This is given generally by $((1<<K)+j)^P$.

The multiplier section 24 multiplies together the output value from the first conversion section 22 and the output value from the second conversion section 23, and outputs the value of v^p.

The operation the signal processing unit structured as described above will now be explained. First, when an input value v is supplied, the exponent part extraction section 20 of FIG. 4 extracts the exponent part from the floating point format for said value v.

For example, if v=6144.0, the bit pattern in floating point format which corresponds to this is 01000101110000000000000000000000, and therefore in this case the exponent part extraction section 20 extracts 10001011.

Next, when the input value v is supplied, the mantissa part extraction section 21 extracts the uppermost K bits (where K=12) of the mantissa part from the floating point format for said value v. In this example, the mantissa part extraction section 21 extracts the value 100000000000.

Next, the first conversion section 22 takes the output value B' 10001011 from the exponent part extraction section 20 as an address for looking up the table shown in FIG. 5. In the case of this example, since the value of B' 10001011 is 139 in decimal, the value in the address 139 is looked up, and the output value 1.000 is obtained.

Next, the second conversion section 23 takes the output value B' 100000000000 from the mantissa part extraction section 21 as an address for looking up the table shown in FIG. 6. In the case of this example, since the value of B' is 100000000000 is 2048 in decimal, the value in the address 2048 is looked up, and the output value 693.966309 is obtained.

Finally, the multiplier section 24 multiplies together the output value from the first conversion section 22 and the output value from the second conversion section 23. In other words, it calculates:

$$1.000*693.966309=693.966309.$$

The result of this multiplication, in this first preferred embodiment, is supplied as the calculated value which was required, i.e. as the value of 6144.0^0.75.

In order to verify the operation of this first preferred embodiment, the calculation process for v^0.75 will again be traced with v=1.875. Since when v=1.875, the corresponding bit pattern in floating point format is 00111111111100000000000000000000, accordingly in this case the exponent part extraction section 20 extracts the value 01111111.

Next, when the input value v is supplied, the mantissa part extraction section 21 extracts the uppermost K bits (where K=12) of the mantissa part from the floating point format for said value v. In this example, the mantissa part extraction section 21 extracts the value 111000000000.

Next, the first conversion section 22 takes the output value B' 01111111 from the exponent part extraction section 20 as an address for looking up the table shown in FIG. 5. In the case of this example, since the value of B' 01111111 is 127 in decimal, the value in the address 127 is looked up, and the output value 0.001953 is obtained.

Next, the second conversion section 23 takes the output value B' 111000000000 from the mantissa part extraction section 21 as an address for looking up the table shown in FIG. 6. In the case of this example, since the value of B' 111000000000 is 3584 in decimal, the value in the address 3584 is looked up, and the output value 820.391052 is obtained.

Finally, the multiplier section 24 multiplies together the output value from the first conversion section 22 and the output value from the second conversion section 23. In other words, it calculates:

0.001953*820.391052=1.602224.

The result of this multiplication, in this first preferred embodiment, is supplied as the calculated value which was required, i.e. as the value of 1.875^0.75.

In the above described embodiment 1, the first and second conversion sections 22 and 23 are constituted by the tables shown in FIGS. 5 and 6, and, for each address i and j, the values of $2^{((i-127-K)*0.75)}$ and $((1<<K)+j)^{0.75}$ are respectively stored therein. But this method of implementation is not absolutely necessary.

Alternatively, it is acceptable for X(i) and Y(i) to be determined as shown below.

$X(i)=2^{((i-((1<<(E-1))-1)-K)*p)}*S$ $Y(j)=(((1<<k)+j)^p)/S$

Figure 7:
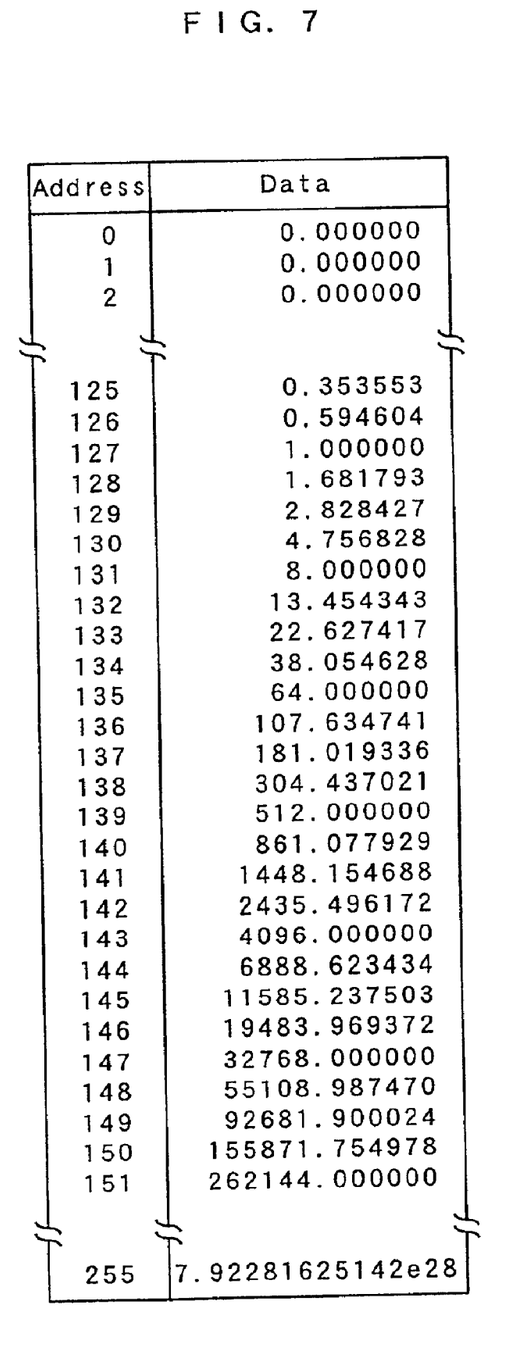
FIG. 7 is another figure showing an example of a table which constitutes the first conversion section.
Figure 8:
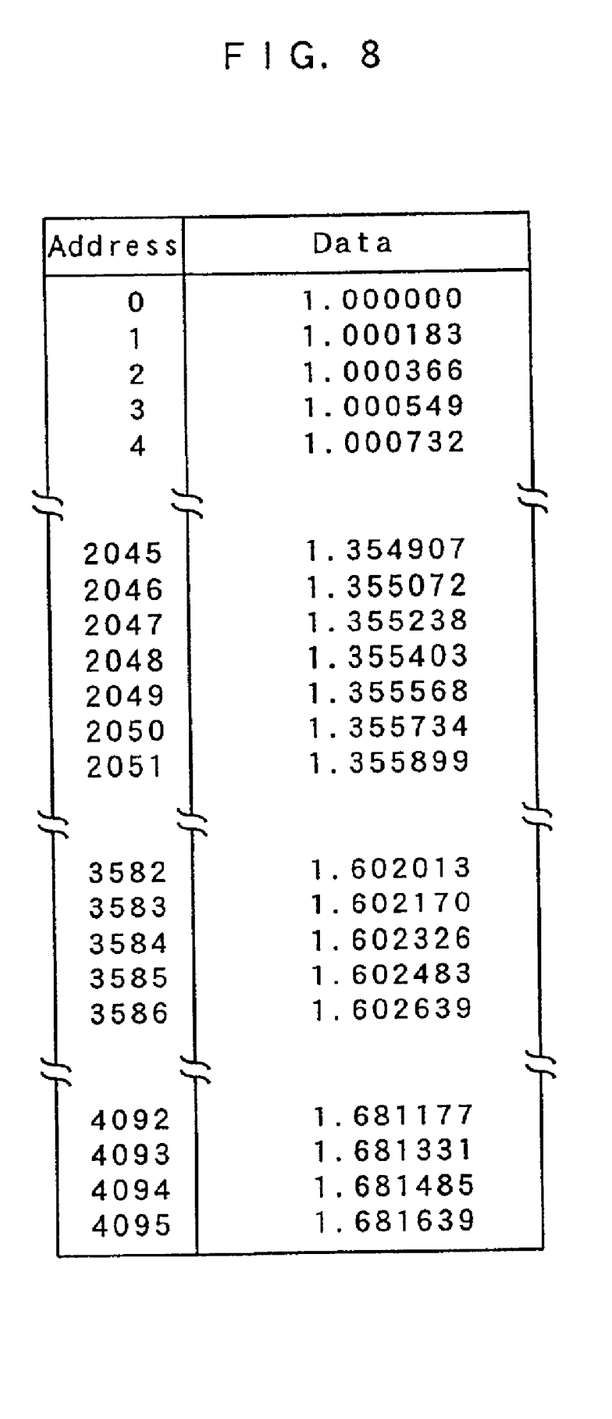
FIG. 8 is another figure showing an example of a table which constitutes the second conversion section.

For example, for the address i, it would also be acceptable to store the value $2^{((i-127)*0.75)}$. In this case, the second conversion section 23 would be constituted as a table in which, for the address j, the value $(1.0+j/(1<<K))^{0.75}$ is stored. This type of tables are shown in FIGS. 7 and 8.

Figure 9:
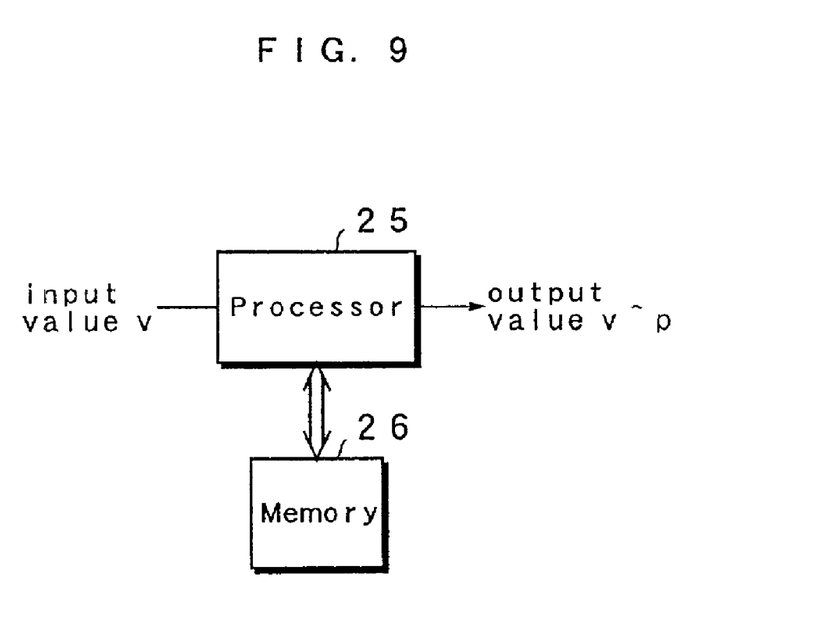
FIG. 9 is a block diagram showing the structure of a signal processing unit according to a variant of the first embodiment of the present invention.

FIG. 9 is a block diagram showing another example of this first embodiment. In this example, the input value v is inputted to a processor 25. The processor 25 is connected to a memory 26. The memory 26 maintains the data which were stored in the tables of the above described first and second conversion sections, and also the program for the processor 25. And this processor 25 executes an exponent part extraction procedure and a mantissa part extraction procedure, which respectively fulfill extraction functions identical to those of the above described exponent part extraction section 20 and mantissa part extraction section 21. Furthermore, the processor 25 executes first and second conversion procedures which respectively fulfil table lookup functions identical to those of the above described first and second conversion sections 22 and 23, and a multiplication procedure (whose function is identical to that of the above described multiplier section 24) in which the data values which have been extracted from the tables by the first and second conversion procedures are multiplied together, the result being outputted as the value of v^p. The programs which specify these procedures and the conversion tables are kept in the memory 26. Furthermore, it is possible to implement the present invention as a program product which is recorded upon a computer readable medium, or which is transmitted over a network.

According to the above described embodiment 1 and its variation, by including a exponent part extraction section which extracts a bit series from an exponent part of a floating point data item, a mantissa part extraction section which extracts the most significant K bits from a mantissa part of the floating point data item, a first conversion section which inputs the output e of the exponent part extraction section and outputs the value of a function X(e) thereof, a second conversion section which inputs the output f of the mantissa part extraction section and outputs the value of a function Y(f) thereof, and a multiplier section which multiplies together the output value from the first conversion section and the output value from the second conversion section, thereby it becomes possible to calculate an exponential using an economical circuit structure, at high speed, and moreover with good calculation accuracy, even when the input value is a floating point data item.

Here by "economical circuit structure" is meant that, since only certain uppermost bits of the mantissa part are extracted by the mantissa part extraction section, and only these uppermost bits are used as an address for looking up the table, therefore the space required in the memory for the table is reduced.

Furthermore, by "high speed" is meant that, since the structure only requires elements for directly extracting portions of the floating point format bit pattern, for table access, and for multiplication, therefore complicated calculation becomes unnecessary, and it is possible to perform the exponentiation procedure at high speed.

Yet further, by "good calculation accuracy" is meant that, since no type conversion from floating point format to integer format is ever required to be performed, therefore in every case, with this preferred embodiment, it is possible to maintain an accuracy of 12 significant decimal places.

Although with the preferred embodiment described above the number K of the uppermost bits which were extracted from the mantissa part was 12, it would also be possible, as a variation, for this number to be different. If the value of K is greater than 12, then, although the calculation accuracy is enhanced to be greater than 12 significant decimal places, the size of the memory required for the corresponding table becomes greater. Conversely, if the value of K is less than 12, then, although the calculation accuracy is deteriorated, the size of the memory required for the corresponding table is reduced. For example, in the case that K=11 so that 11 bits are extracted, then in the first conversion section 22, for the address i, the value stored becomes $2^{((i-127-11)*0.75)}$, and in the second conversion section 23, for the address j, the value stored becomes (2048+j)0.75.

Embodiment 2

Next second preferred embodiment of the signal processing unit and method of the present invention will be explained with reference to the drawings. With the second preferred embodiment, as an application of the exponential calculation device and method of the present invention, the structure for obtaining the value converted to an integer of the exponential value v^1.0, in other words the structure and operation of the device which performs type conversion of the floating point value v to an integer. Since the procedure of performing type conversion of a floating point value to an integer is extremely often executed during the procedure of encoding audio or video, if this procedure can be executed at high speed, the efficiency becomes very high. For example, in an audio encoder according to the MPEG2 or the MPEG4AAC standard, for a floating point value v for which is greater than or equal to 1.0 and less than 8192.0, the procedure of performing type conversion of the value of v to an integer value is often executed.

In this second preferred embodiment of the present invention, an item of floating point data which is made up from an E-bit exponent part and an F-bit mantissa part will be termed v, and when the value of v is greater than or equal to 2.0 and less than 2^N and N is a natural number, the operation will be explained of signal processing unit which raises v to the power 1 and outputs the result converted into an integer value.

Figure 10:
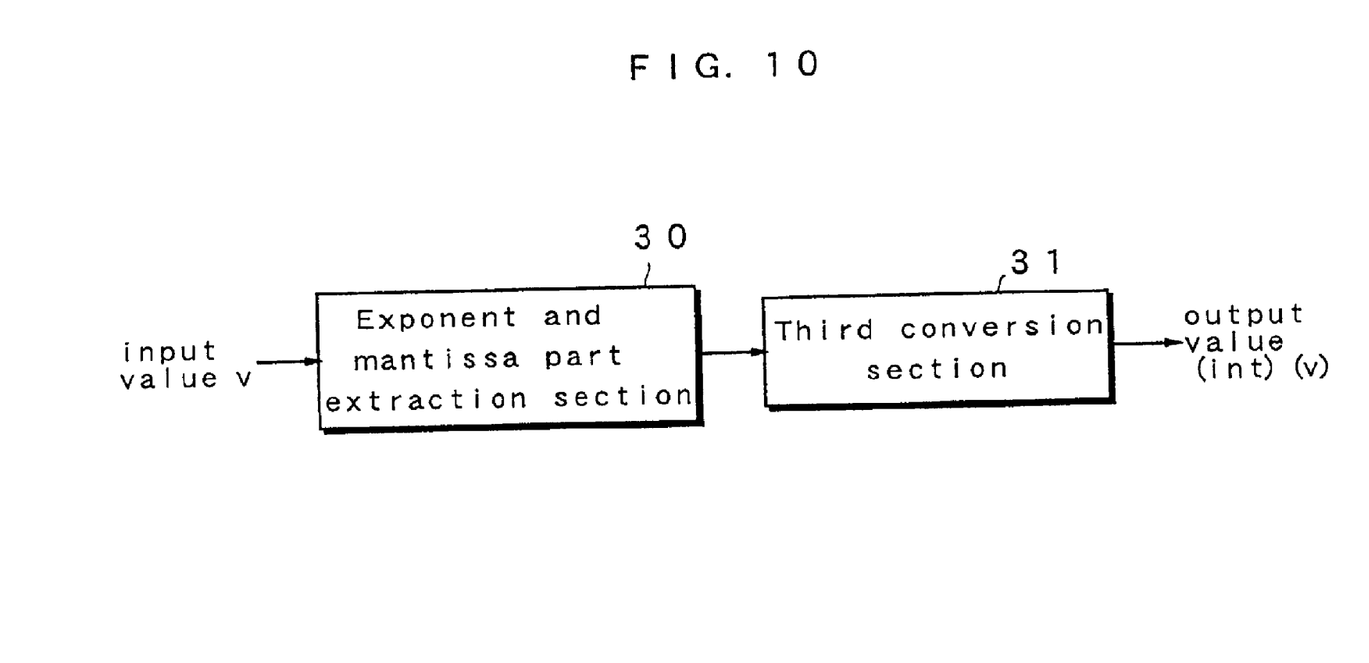
FIG. 10 is a block diagram showing the structure of a signal processing unit according to a second preferred embodiment of the present invention.

FIG. 10 is a block diagram showing the structure of an exponential calculation device according to this second preferred embodiment. This signal processing unit comprises an exponent part and mantissa part extraction section 30 and a third conversion section 31. If the number of bits in which (N−2) is expressed in binary notation is M, the exponent part and mantissa part extraction section 31 is structured so as to extract a bit field consisting of at least the lowermost M bits of the exponent part and at least the uppermost (N−1) bits of the mantissa part. If the value given by the bit field which has been extracted from the exponent part and mantissa part extraction section 30 is termed w, the third conversion section 31 is structured so as to store in advance as a table the values of v converted to integers for all the addresses w which are obtained for this bit field. The third conversion section uses the value w given by the bit field as an input and reads out the value from the table.

When the value of v is greater than or equal to 2.0 and less than 2^N, the reason that it is sufficient to extract a certain number of digits that (N−2) is expressed in binary number from the extraction section 30, is as follows.

First, since the value e of the exponent part when v=2^N is 2^N=2^(e−127)
therefore e=N+127.

Here, since v is supposed to be greater than or equal to 2.0 (greater than or equal to 2^1), e is greater than or equal to 128. Thus, since with this condition the most significant bit of the 8-bit exponent part is necessarily "1", when discriminating its value, at least the information in the highest bit is not required, and a number of bits on the low side are sufficient. Here, which bits are necessary is determined according to the value of N, in the following manner. When the value of the exponent part e with the most significant bit excluded is termed e', then since by the above equation $$e = N + 127$$

therefore:

$$e' = e - 128 = N + 127 - 128 = N - 1.$$

Thus the number of bits which are required to express e' is the number of bits which are required to express (N−1). Since in this second preferred embodiment the value of v is taken as being less than 2^N, the value which gives e' is one less, and the number of bits which are required becomes the number of bits which are required to express (N−2).

Furthermore, next, when the value of v is taken as being greater than or equal to 2.0 and is less than 2^N, the reason for extracting from the mantissa part the bit field of at least its most significant (N−1) bits is as follows. Since in this second preferred embodiment the explanation is being made in terms of a device which converts floating point data to integer form, attention should be paid to how many bits the value converted to an integer of a value less than 2^N is expressed by. For example, since a value less than 2^5 is less than 32, it can be expressed with 5 bits. In the same manner, since a value less than 2^6 is less than 64, it can be expressed with 6 bits. Thus, in the floating point format of this second preferred embodiment, the mantissa part stores the value by shifting it on the most significant bit side, and moreover is expressed in a form with the most significant bit eliminated, thereby its value becomes expressed by a number of bits one bit fewer than the required number of bits when converted to an integer. Accordingly, since when the value is less than 2^N, it is possible to discriminate the values by extracting N−1 bits from the mantissa part, therefore this bit field of the most significant (N−1) bits is extracted from the mantissa part.

By this type of structure, and by taking the value which has been extracted by the exponent and mantissa part extraction section 30 as an address and using this address for looking up the table which constitutes the third conversion section 31, it is possible, even if the input value is an item of floating point data, to perform exponential calculation with an economical circuit structure and at high speed.

In the following, in order to simplify the explanation, the structure and operation of the signal processing unit which performs type conversion of a floating point value v to an integer value will be explained for the case when v is greater than or equal to 2.0 and less than 2^N, i.e. 32.0. In the exponent and mantissa part extraction section 30, a bit pattern which includes the uppermost N−1 bits of the mantissa part is extracted from the bit field which straddles the exponent part and the mantissa part of the inputted item of floating point data. In this second preferred embodiment the floating point format is supposed to be the one shown in FIG. 3, and the lowermost 2 bits of its exponent part and the uppermost 4 bits of its mantissa part are extracted. In other words, a continuous field from the 20th bit through the 25th bit of the floating point format is extracted, and this is termed w.

The intention of extracting this type of bit pattern is as follows.

At this time, the region for the floating point value v which is inputted is greater than or equal to 2.0 and less than 32.0, and what is required is (int) (v^1). Accordingly, the output value is an integer greater than or equal to 2 and less than or equal to 31. Now here, for example, since the bit pattern for the floating point value 2.0 is:
0 10000000 00000000000000000000000
and the first pattern of the floating point value for 31.99999999999999 is:
0 10000011 11111111111111111111111.

Therefore in this region the bits that vary in the exponent part are only the lowermost two bits of said exponent part. To put it in the opposite way, it will be understood that, if these lowermost two bits are known, the process of adding 128 to their value can introduce the value of the original exponent part.

On the other hand, for the mantissa part, although all the 23 bits vary, since the effective number of digits in the final output value is 5 bits, the necessary bits for the mantissa part are only the uppermost 4 bits in the mantissa part. In other words, the bits of the mantissa part other than its uppermost 4 bits are bits which can be discarded from the point of view of the final result. Due to this, in the exponent and mantissa It part extraction section 30, only the minimum amount required is extracted, which consists of the lowermost 2 bits in the exponent part and the uppermost 4 bits in the mantissa part.

Figure 11:
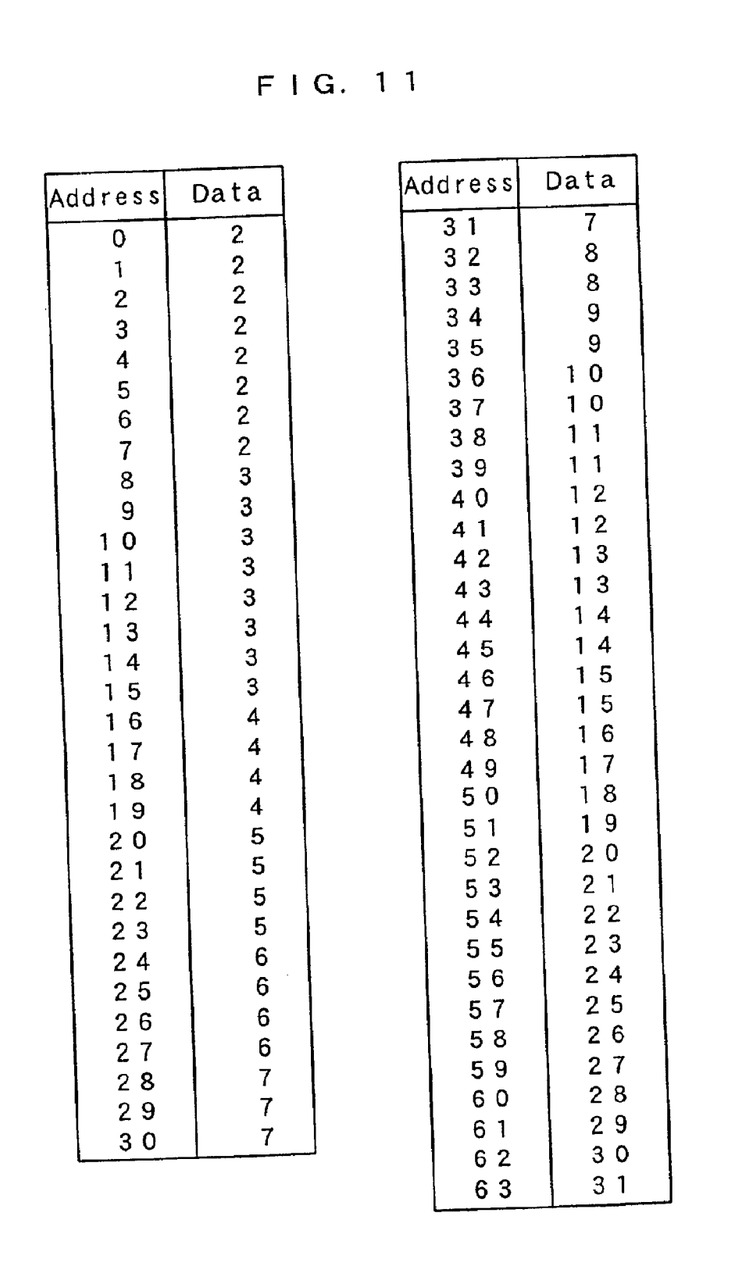
FIG. 11 is a figure showing an example of a table which constitutes a third conversion section.

The third conversion section 31 receives the output value from the section 30, and outputs the value of a function Z(i,j). Here, i and j are values obtained from w. FIG. 11 shows a table which constitutes the third conversion section 31 in this embodiment. A value calculated as described below is stored in the address w of this table. That is to say, i is the value obtained by adding 128 to the uppermost 2 bits of w, in other words the value of the exponent part of the original floating point data item accessed by the extraction section 30, while j is the value of the lowermost 4 bits of w, in other words the value of the uppermost 4 bits of the mantissa part of the original floating point data item accessed by the extraction section 30. The value given by $(2^{((i-127-4)*1.0)})*((1<<4)+j)^{1.0}$ is stored in the address w.

The operation of the signal processing unit structured as described above will now be explained. First, the exponent and mantissa part extraction section 30 of FIG. 10 receives the input value v, and extracts from the floating point format for said value v a continuous bit field of the 6 bits from the 20th bit through the 25th bit. For example, if v=3.75, since the bit pattern for the floating point format which corresponds to this is 01000000011100000000000000000000, therefore in this case the exponent and mantissa part extraction section 30 extracts the bit field 001110.

Next, the third conversion section 31 looks up the table shown in FIG. 11 using as an address the output value B' 001110 from extraction section 30. In the case of this example, since B' 001110 is 14 in decimal, the value in the address 14 is read out, and the output value 3 is obtained. This is the value when type converted into an integer of the input value 3.75.

In order to check the operation of this second preferred embodiment, the process will be followed through again for the input value v=20.75. If v=20.75, since the bit pattern for the floating point format which corresponds to this is 01000001101001100000000000000000, therefore in this case the exponent and mantissa part extraction section 30 extracts the bit field 110100.

Next, the third conversion section 31 looks up the table shown in FIG. 11 using as an address the output value B' 110100 from the extraction section 30. In the case of this example, since B' 110100 is 52 in decimal, the value in the address 52 is read out, and the output value 20 is obtained. This is the value when type converted into an integer of the input value 20.75.

In this second preferred embodiment as well, in the same manner as with FIG. 9, the required steps are maintained in memory using a processor and a memory, and it is possible to implement the conversion process via software processing by storing and maintaining the conversion table which corresponds to the third conversion section 31. Furthermore, it is also possible to implement the present invention as a computer readable medium for a program on which a computer performs the method of the present invention, or as a program product which can be transmitted via a computer network.

In particular, with the second preferred embodiment of the present invention, since p=1 and thus the values which are stored in the table are integer values, thereby as a result the embodiment can perform type conversion for an input value v in floating point format to an integer value at high speed.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-222264 filed Jul. 24, 2000 is hereby incorporated by reference.

What is claimed is:

1. A signal processing unit which calculates the value of v^p, where v is an item of floating point data made up from an E-bit exponent part and an F-bit mantissa part, and p is a constant, comprising:

an exponent part extraction section which extracts a bit series from said exponent part of said floating point data item;

a mantissa part extraction section which extracts the most significant K bits from said mantissa part of said floating point data item;

a first conversion section which inputs the output e of said exponent part extraction section and outputs the value of a function X(e) thereof;

a second conversion section which inputs the output f of said mantissa part extraction section and outputs the value of a function Y(f) thereof; and a multiplier section which multiplies together the output value from said first conversion section and the output value from said second conversion section;

wherein:

when i and j are taken as integers, said function X(i) is a function which returns the value:

$$X(i)=2^{((i-((1<<E-1)-1)-K)*p)},$$

and said function Y(j) is a function which returns the value:

$$Y(j)=((1<<K)+j)^p.$$

2. A signal processing unit according to claim 1, wherein:

said first conversion section is constituted as a table in which, f or each address i, the value of X(i) is stored in advance; and said second conversion section is constituted as a table in which, for each address j, the value of Y(j) is stored in advance.

3. A signal processing unit which calculates the value of v^p, where v is an item of floating point data made up from an E-bit exponent part and an F-bit mantissa part, and p is a constant, comprising:

an exponent part extraction section which extracts a bit series from said exponent part of said floating point data item;

a mantissa part extraction section which extracts the most significant K bits from said mantissa part of said floating point data item;

a first conversion section which inputs the output e of said exponent part extraction section and outputs the value of a function X(e) thereof;

a second conversion section which inputs the output f of said mantissa part extraction section and outputs the value of a function Y(f) thereof; and a multiplier section which multiplies together the output value from said first conversion section and the output value from said second conversion section;

wherein:

when i and j are taken as integers, for some real number S, said function X(i) is a function which returns the value:

$$X(i)=2^{((i-((1<<E-1)-1)-K)*p)}*S,$$

and said function Y(j) is a function which returns the value:

$$Y(j)=((1<<K)+j)^{p}/S.$$

4. A signal processing unit according to claim 3, wherein:

said first conversion section is constituted as a table in which, for each address i, the value of X(i) is stored in advance;

and said second conversion section is constituted as a table in which, for each address j, the value of Y(j) is stored in advance.

5. A signal processing unit which, where v is an item of floating point data made up from an E-bit exponent part and an F-bit mantissa part, when the value of v is greater than or equal to 2.0 and less than $2^N$, where N is a natural number, calculates and outputs the value of v raised to a first power and converted to an integer value, comprising:
- an exponent and mantissa part extraction section which, when the number of bits in which (N−2) is expressed in binary notation is M, extracts a bit field including a predetermined number of lowermost M bits of said exponent part and a predetermined number of uppermost (N−1) bits of said mantissa part; and
- a third conversion section which, when the value expressed by said bit field which has been extracted by said exponent and mantissa part extraction section is w, stores in a table in advance the values of v converted into integer values in all the addresses w extracted by this bit field, and which inputs the value w given by said bit field and reads out the corresponding value from said table.

6. A signal processing method operable to calculate the value of $v^p$, where v is an item of floating point data made up from an E-bit exponent part and an F-bit mantissa part, and p is a constant, comprising the steps of:
- extracting a bit series from said exponent part of said floating point data item;
- extracting the most significant K bits from said mantissa part of said floating point data item;
- inputting the output e of the exponent part extraction and outputting the value of a function X(e) thereof, by storing in a table, for integer values of i, values X(i) to be returned given by $2^{((i-((1<<E-1)-1)-K)*p)}$;
- inputting the output f of the mantissa part extraction and outputting the value of a function Y(f) thereof, by storing in a table, for integer values of j, values Y(j) to be returned given by $((1<<K)+j)^p$; and:
- multiplying together the output values of said functions X(e) and Y(f).

7. A signal processing method for, where v is an item of floating point data made up from an E-bit exponent part and an F-bit mantissa part, when the value of v is greater than or equal to 2.0 and less than $2^N$, where N is a natural number, calculating and outputting the value of v raised to a first power and converted to an integer value, said method comprising the steps of:
- extracting a bit field including a predetermined number of lowermost M bits of the exponent part and a predetermined number of uppermost (N−1) bits of the mantissa part when the number of bits, in which (N−2) expressed in binary notation is M; and storing in a table in advance the values of v converted into integer values in all addresses where w is extracted by the bit field, and inputting the value w given by the bit field and reading out the corresponding value from the table when the value expressed by the bit field is w.

8. A computer readable medium storing instructions for performing a signal processing method operable to calculate the value of $v^p$, where v is an item of floating point data made up from an E-bit exponent part and an F-bit mantissa part, and p is a constant, comprising the steps of:
- extracting a bit series from said exponent part of said floating point data item;
- extracting the most significant K bits from said mantissa part of said floating point data item;
- inputting the output e of the exponent part extraction and outputting the value of a function X(e) thereof, by storing in a table, for integer values of i, values X(i) to be returned given by $2^{((i-((1<<E-1)-1)-K)*p)}$;
- inputting the output f of the mantissa part extraction and outputting the value of a function Y(f) thereof, by storing in a table, for integer values of j, values Y(j) to be returned given by $((1<<K)+j)^p$; and:
- multiplying together the output values of said functions X(e) and Y(f).

9. A computer readable medium storing instructions for performing a signal processing method for, where v is an item of floating point data made up from an E-bit exponent part and an P-bit mantissa part, when the value of v is greater than or equal to 2.0 and less than $2^N$, where N is a natural number, calculating and outputting the value of v raised to a first power and converted to an integer value, said method comprising the steps of:
- extracting a bit field including a predetermined number of lowermost M bits of the exponent part and a predetermined number of uppermost (N−1) bits of the mantissa part when the number of bits in which (N−2) expressed in binary notation is M; and storing in a table in advance the values of v converted into integer values in all addresses where w is extracted by the bit field, and inputting the value w given by the bit field and reading out the corresponding value from the table when the value expressed by the bit field is w.

10. A program product for performing a signal processing method operable to calculate the value of $v^P$, where v is an item of floating point data made up from an E-bit exponent part and an F-bit mantissa part, and p is a constant, comprising the steps of:
- extracting a bit series from said exponent part of said floating point data item;
- extracting the most significant K bits from said mantissa part of said floating point data item;
- inputting the output e of the exponent part extraction and outputting the value of a function X(e) thereof, by storing in a table, for integer values of i, values X(i) to be returned given by $2^{((i-((1<<E-1)-1)-K*p)}$;
- inputting the output f of the mantissa part extraction and outputting the value of a function Y(f) thereof, by storing in a table, for integer values of j, values Y(j) to be returned given by $((1<<K)+j)^p$; and:
- multiplying together the output values of said functions X(e) and Y(f).

11. A program product for performing a signal processing method for, where v is an item of floating point data made up from an E-bit exponent part and an F-bit mantissa part, when the value of v is greater than or equal to 2.0 and less than $2^N$, where N is a natural number, calculating and outputting the value of v raised to a first power and converted to an integer value, said method comprising the steps of:
- extracting a bit field including a predetermined number of lowermost M bits of the exponent part and a predetermined number of uppermost (N−1) bits of the mantissa part when the number of bits in which (N−2) expressed in binary notation is M; and
- storing in a table in advance the values of v converted into integer values in all addresses where w is extracted by the bit field, and inputting the value w given by the bit field and reading out the corresponding value from the table when the value expressed by the bit field is w.

* * * * *

UNITED STATES PATENT AND TRADEMARK OFFICE
CERTIFICATE OF CORRECTION

PATENT NO. : 6,898,615 B2
DATED : May 24, 2005
INVENTOR(S) : Shuji Miyasaka et al.

It is certified that error appears in the above-identified patent and that said Letters Patent is hereby corrected as shown below:

Column 10,
Line 25, "f or" should read -- for --.

Column 11,
Line 49, "bits, in" should read -- bits in --.

Signed and Sealed this

Thirtieth Day of August, 2005

JON W. DUDAS
*Director of the United States Patent and Trademark Office*